(12) United States Patent (10) Patent No.: US 11,046,348 B2
Ballu                                          (45) Date of Patent:    Jun. 29, 2021

(54) DEVICE FOR RIDING SURFBOARD

(71) Applicant: Arnaud Ballu, Biviers (FR)

(72) Inventor: Arnaud Ballu, Biviers (FR)

( * ) Notice: Subject to any disclaimer, the term of this patent is extended or adjusted under 35 U.S.C. 154(b) by 33 days.

(21) Appl. No.: 16/478,058

(22) PCT Filed: Jan. 14, 2018

(86) PCT No.: PCT/EP2018/050797
§ 371 (c)(1),
(2) Date: Jul. 15, 2019

(87) PCT Pub. No.: WO2018/130671
PCT Pub. Date: Jul. 19, 2018

(65) Prior Publication Data
US 2019/0359242 A1    Nov. 28, 2019

(30) Foreign Application Priority Data
Jan. 15, 2017   (FR) ..................................... 1770052

(51) Int. Cl.
*B62B 13/04*   (2006.01)
*A63C 5/03*    (2006.01)
(Continued)

(52) U.S. Cl.
CPC .............. *B62B 13/043* (2013.01); *A63C 5/03* (2013.01); *A63C 5/06* (2013.01); *B62B 13/046* (2013.01); *B62B 13/16* (2013.01); *A63C 2203/10* (2013.01)

(58) Field of Classification Search
CPC .... B62B 13/043; B62B 13/046; B62B 17/061
(Continued)

(56) References Cited

U.S. PATENT DOCUMENTS 3,917,301 A  *  11/1975  Fabris ................... B62B 13/043
                                                 280/28.14
4,773,659 A  *   9/1988  Rygiel ................... B62B 13/04
                                                 280/142
(Continued)

FOREIGN PATENT DOCUMENTS

DE          10102340 A1    7/2002
FR          2732609        10/1996

OTHER PUBLICATIONS

International Search Report for Application No. PCT/EP2018/050797.
Written Opinion for Application No. PCT/EP2018/050797.

*Primary Examiner* — Jeffrey J Restifo
(74) *Attorney, Agent, or Firm* — Cantor Colburn LLP

(57) ABSTRACT

The invention concerns a device for controlling a monoski (1), in particular for snow, by means of the combined simple rotation and simple tilting of a single control member such as a handlebar, simultaneously by lateral inclination and by longitudinal twisting. It therefore combines the necessary mechanical functions of a pair of conventional fixtures with the ease of use of a bicycle, and does not require a specific monoski. It makes it possible to move freely on the snow, controlling with both feet held but not locked, or indeed to use one foot to help push on flat terrain and provide stability. The lever arm provided by the control member is considerably superior to that of a pair of conventional fixtures, greatly improving ease of use and the maximum capacities of the device. Finally, it can be quickly folded for ease of handling and storage.

17 Claims, 6 Drawing Sheets

(51) Int. Cl.
*A63C 5/06* (2006.01)
*B62B 13/16* (2006.01)

(58) Field of Classification Search
USPC ............................... 280/14.27, 14.28, 14.21
See application file for complete search history.

(56) References Cited

U.S. PATENT DOCUMENTS

| | | | | |
|---|---|---|---|---|
| 5,351,975 A * | 10/1994 | Petoud | ................. | B62B 17/065 |
| | | | | 280/14.28 |
| 6,139,031 A * | 10/2000 | Wingard | ................. | A63C 5/03 |
| | | | | 280/14.28 |
| 6,736,414 B2 * | 5/2004 | Farrally-Plourde | ..... | B62B 13/04 |
| | | | | 280/14.25 |
| 6,997,465 B2 * | 2/2006 | Jungnickel | ............ | B62B 13/043 |
| | | | | 280/14.27 |
| 7,104,551 B2 * | 9/2006 | Takahashi | ............... | B62B 13/04 |
| | | | | 280/14.25 |
| 7,204,496 B2 * | 4/2007 | Rawcliffe | .............. | A63C 10/02 |
| | | | | 280/14.21 |
| 7,438,297 B2 * | 10/2008 | Fernandez | .............. | B62K 3/002 |
| | | | | 280/14.27 |
| 7,547,023 B2 * | 6/2009 | Yau | ....................... | B62B 13/043 |
| | | | | 280/16 |
| 8,177,241 B1 * | 5/2012 | Marks | ................... | B62B 13/046 |
| | | | | 280/14.28 |
| 8,308,172 B2 * | 11/2012 | Gulbranson | .......... | B62B 13/043 |
| | | | | 280/14.1 |
| 9,403,551 B2 * | 8/2016 | Van Der Werf | ...... | B62B 17/061 |
| 9,637,156 B2 * | 5/2017 | Rapp | .................... | B62B 17/063 |
| 9,771,121 B2 * | 9/2017 | Luckenbill | ............... | B63B 34/10 |
| 9,828,015 B2 * | 11/2017 | Kasparian | .............. | B62B 13/046 |
| 9,908,554 B2 * | 3/2018 | Corning | ............... | B62B 17/065 |
| 10,023,219 B2 * | 7/2018 | Kitazawa | ................ | B62B 17/08 |
| 10,252,740 B2 * | 4/2019 | Pierce | .................. | B62B 17/062 |
| 10,549,175 B2 * | 2/2020 | Arcouette | ............. | B62B 17/065 |
| 2004/0075227 A1 * | 4/2004 | Jungnickel | ............ | B62B 13/043 |
| | | | | 280/14.21 |
| 2006/0197294 A1 * | 9/2006 | Yau | ....................... | B62B 13/043 |
| | | | | 280/16 |

\* cited by examiner

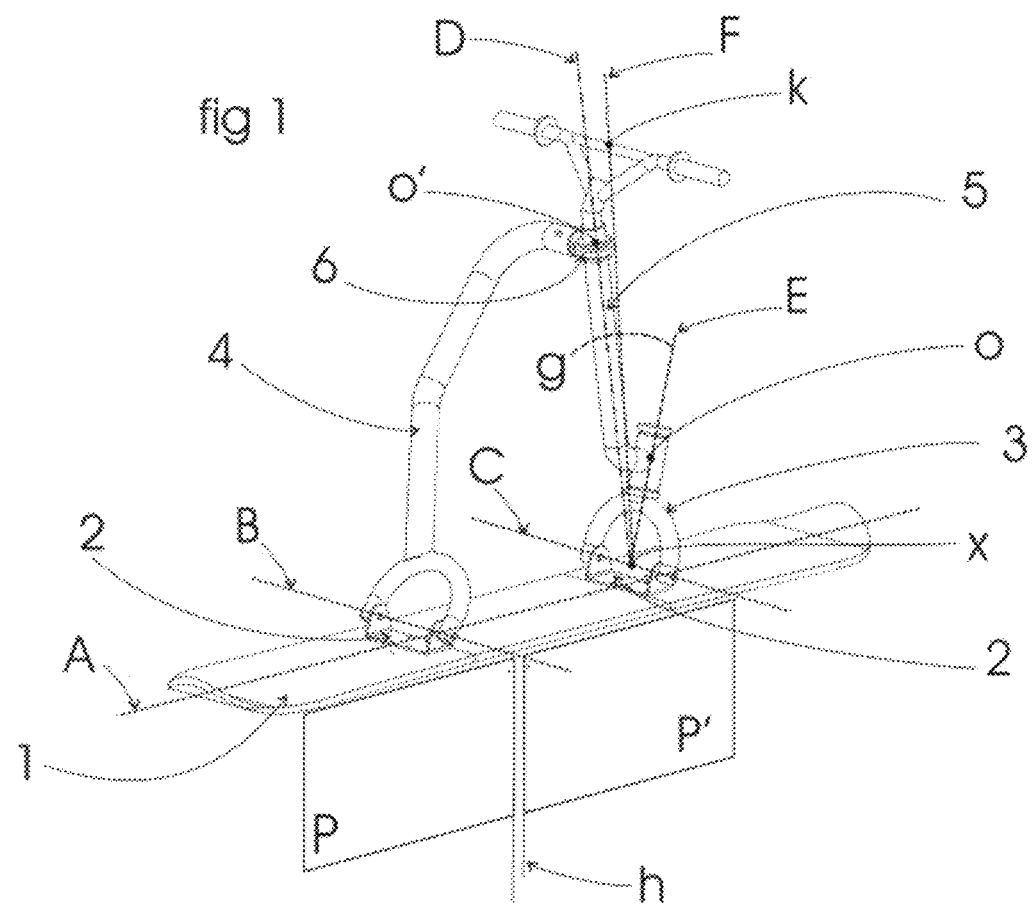
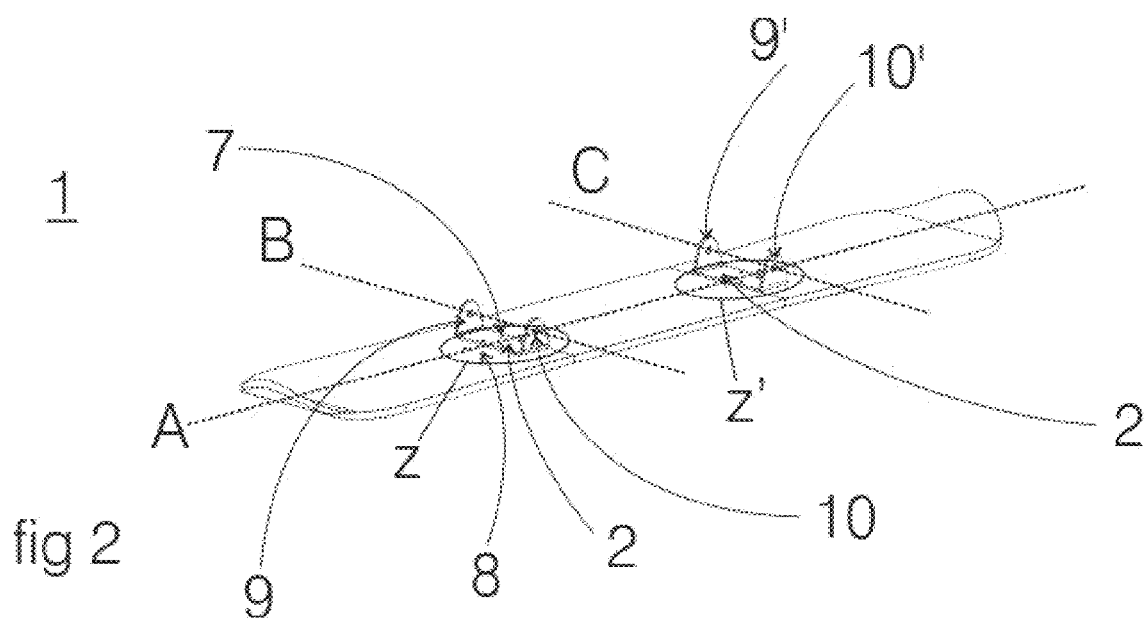

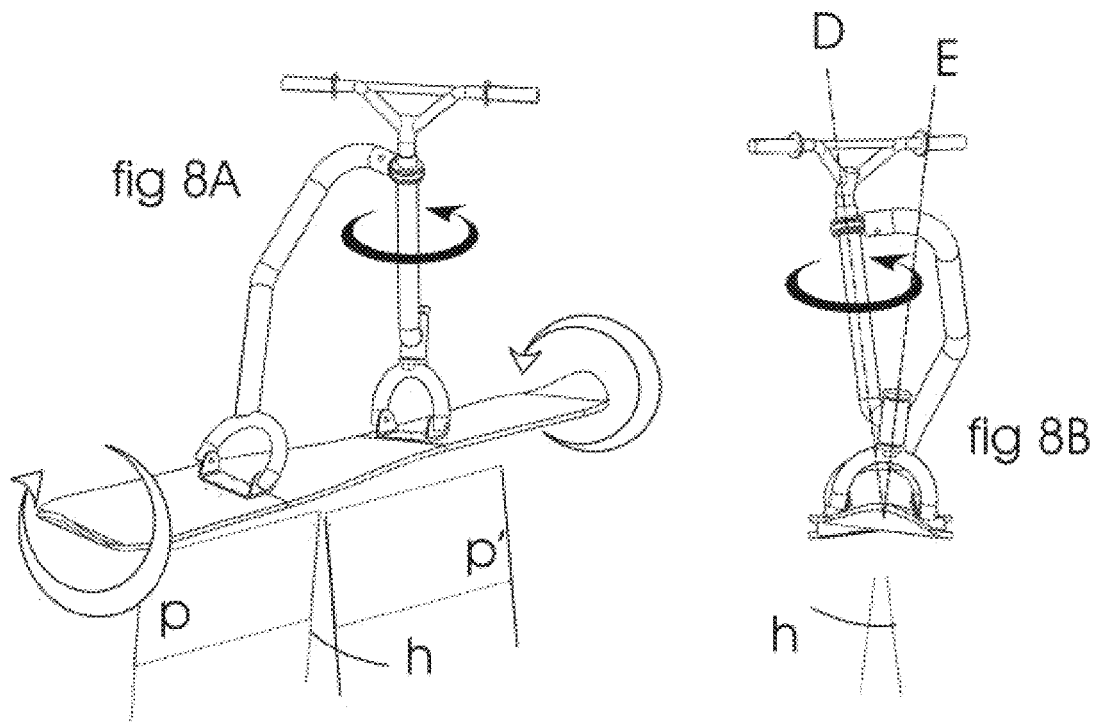
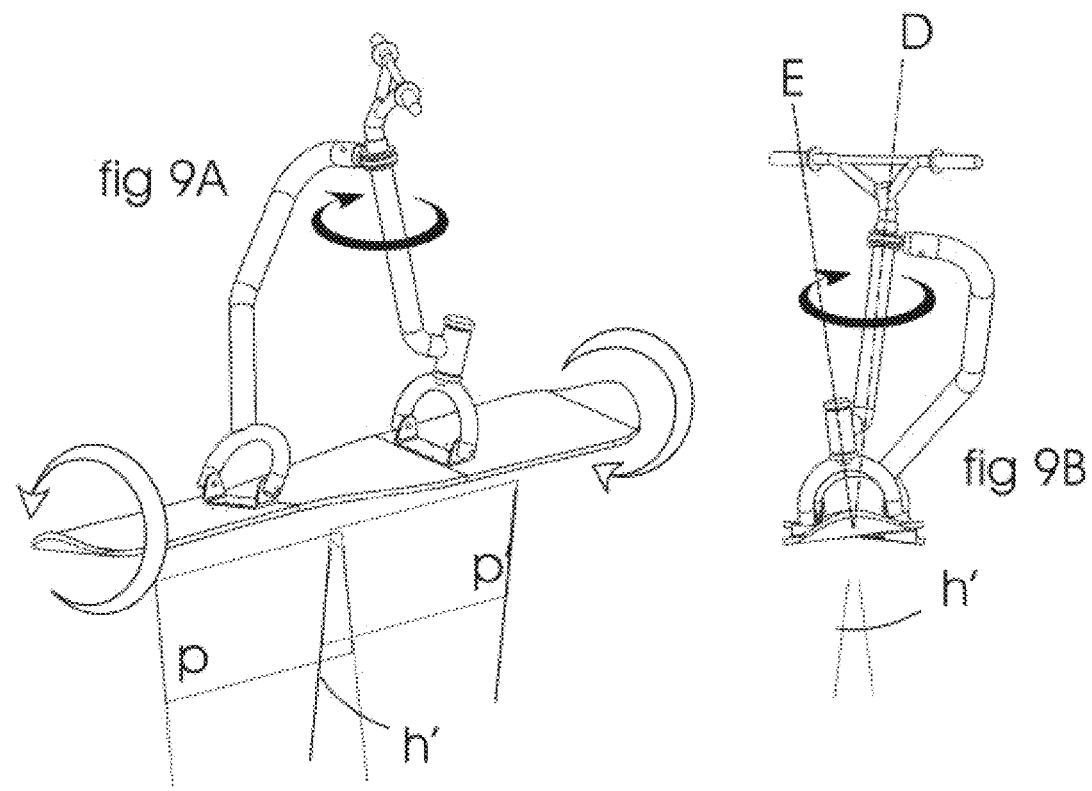

DEVICE FOR RIDING SURFBOARD

CROSS REFERENCE TO RELATED APPLICATIONS

This application is a National Stage of PCT Application No. PCT/EP2018/050797 filed on Jan. 14, 2018, which claims priority to French Patent Application No. 1770052 filed on Jan. 15, 2017, the contents each of which are incorporated herein by reference thereto.

FIELD

The present application concerns a device for riding a surfboard, in particular a snow surfboard.

STATE OF THE ART

It is well known to make multiple shapes for user control on a snow surfboard, without necessarily having the feet locked on the board.

A known device consists in taking on the principle of the bicycle by fastening a first rigid surfboard with substantially reduced dimensions to the fixed rear portion of a frame equipped at its front portion with a steering column with a handlebar at the top. The bottom end of this steering member is equipped with a second board, generally with dimensions smaller than that fastened at the rear. Besides this equipment not really replicating the dynamic behavior of neither a bicycle nor a snow surfboard, its cost imposed by two specific boards and its bulk constitute major drawbacks.

There are also different devices such as holding bars fastened at the level of the hips over a portion of the board but which control only the attitude of the board in the fixed area and not the total longitudinal warping of the latter. Yet, it is now known that the inclination alone of a portion of the length of the board is not enough to ensure the riding thereof because the warping resulting from the weight of the user is subjected and not controlled.

OBJECT OF THE INVENTION

The object of the present invention consists in making a device for controlling a surfboard for snow, through the combined simple rotation and simple swinging of a unique ride member such as a handlebar, simultaneously by lateral inclination and by longitudinal warping. Hence, it combines the necessary mechanical functionalities of a pair of conventional attachments with the easiness of use of a bicycle and does not require a specific surfboard. It allows moving freely over the snow by riding with both feet retained but not locked, or else using one foot to push on the flat surface and get stable. The lever arm offered by the ride member is higher than that of a pair of conventional attachments, thereby considerably improving the easiness of use and the maximum capabilities of the appliance. Finally, it is instantaneously folded for easy handling and storage.

This device for riding a surfboard, in particular for snow, comprises a first feet stand area z, located substantially over a first half of the board, preferably located mostly in the second fifth of the board, and composed in particular by screw inserts disposed on either side of an axis A crossing the board longitudinally at its center of gravity; the perpendicular of the board with the axis A at the level of the area z forming a first plane P, a second feet stand area z' identical to the first one, located substantially over the second half of the board, preferably located mostly in the fourth fifth of the board, the perpendicular of the board with the axis A at the level of the area z' forming a second plane P'.

This ride device is characterized in that it includes:
a first linking element, with adapted shape and length, secured to the board by a first end a first subplate at the level of the area z and constrained at least parallel to the plane P at a point o' of its second end;
a second linking element, with adapted shape and length, secured to the board by a first end a second subplate at the level of the area z' and constrained at least parallel to the plane P' at a point o of its second end;
a third warping element, with adapted shape and length, secured to the linking element at least at the level of the point o', to the linking at least at the level of the point o, and keeping between the points o' and o' a fixed and predetermined distance;
the free mobilization of the warping element imposing a shift of the point o relative to the plane P and of the point o' relative to the plane P'.

The document FR 2 732 609 describes a snow surfboard controlled by at least one handle and the document US 2006/197294 describes a device for controlling a foldable ski vehicle operating by gravity.

BRIEF DESCRIPTION OF THE DRAWINGS

The invention will be better understood with reference to the figures:

FIG. 1 represents a perspective overview of a surfboard equipped with an embodiment of the device according to the invention, at rest, and presenting different elements, axes and planes describing the invention and the kinematics thereof.

FIG. 2 represents a perspective detail view of an embodiment of a board and of its subplates.

FIGS. 8A and 8B respectively represent a perspective view and a front view of a surfboard equipped with the device according to the invention, and whose ride member is mobilized in a counterclockwise direction, generating an angle h according to the planes P and P'.

FIGS. 9A and 9B respectively represent a perspective view and a front view of a surfboard equipped with the device according to the invention, and whose ride member is mobilized in a clockwise direction, generating an angle h' according to the planes P and P'.

DESCRIPTION OF A PREFERRED EMBODIMENT OF THE INVENTION

Figure 3:
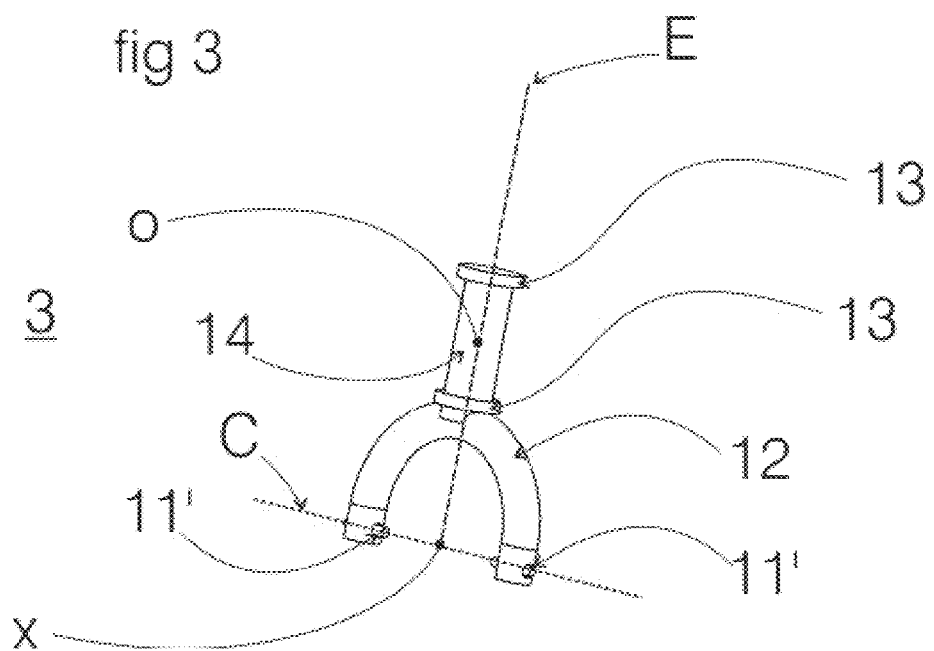
FIG. 3 represents a perspective detail view of an embodiment of a linking element.

Unless specified otherwise, the expressions «about» and «substantially» means just about 10%, preferably just about 5%.

Referring to the figures, a snow surfboard 1 of the same type as those usually found in the market is equipped with a preferred embodiment of the device according to the invention. It includes two feet stand areas z and z', represented in FIG. 2, each located substantially over an opposite half of the board. These stand areas are equipped with embedded metallic inserts 8 allowing securing attachments thereto by means of screws. In general, these groups of inserts are more numerous than the number that might be used by the conventional attachments in order to provide a longitudinal setting range.

A first subplate 2 is conventionally disposed on the first area z by means of fastening holes 7 and screws (not represented) and collaborating with inserts 8. An axis A crosses the board 1 longitudinally at the middle thereof. Hence, the subplate 2 is disposed on either side of the longitudinal axis A and has at each side two axis legs 9 each equipped with an axis hole 10, these two holes 10 being coaxial according to a transverse axis B. The subplate 2 is dimensioned and made of a resistant material such as metal or composites fibers allowing supporting the constraints to which it is subjected while maintaining contained weight and bulk. Its width on the board 1 allows engaging the foot easily therebetween.

According to a variant which is not represented, the two holes 10 of the subplate 2 receive the ends of a strap for holding the feet. This strap is commonly adjustable and padded for more comfort. Most of the time, it is made by at least one rack made of aplastic material collaborating with a latch enabling easy adjustment of the length thereof.

A second subplate 2' identical to the first subplate 2 is similarly disposed at the level of the second area z' of the board 1 and similarly defines a transverse axis C parallel to the axis B. Hence, the subplate 2' is disposed on either side of the longitudinal axis A and has on each side two axis legs 9' equipped with an axis hole 10', these two holes 10' being coaxial according to the transverse axis C.

A user can place a first foot over the first area z and a second foot over the second area z'. Henceforth, by dividing the board lengthwise into five successive portions with the same length, most of the bearing surface of the first foot on the board 1 is located in the second portion of the board and most of the bearing surface of the first foot on the board 1 is located in the fourth portion.

There is defined (as represented in FIG. 1) a plane P perpendicular to the board 1 and to the axis B at the level of the area z. There is also defined a second plane P' perpendicular to the upper face of the board 1 and to the axis C at the level of the area z'. The angle between the planes P and P' is designated as h. When the board 1 is at rest, the planes P and P' are parallel and the angle h therebetween is therefore zero.

Figure 4:
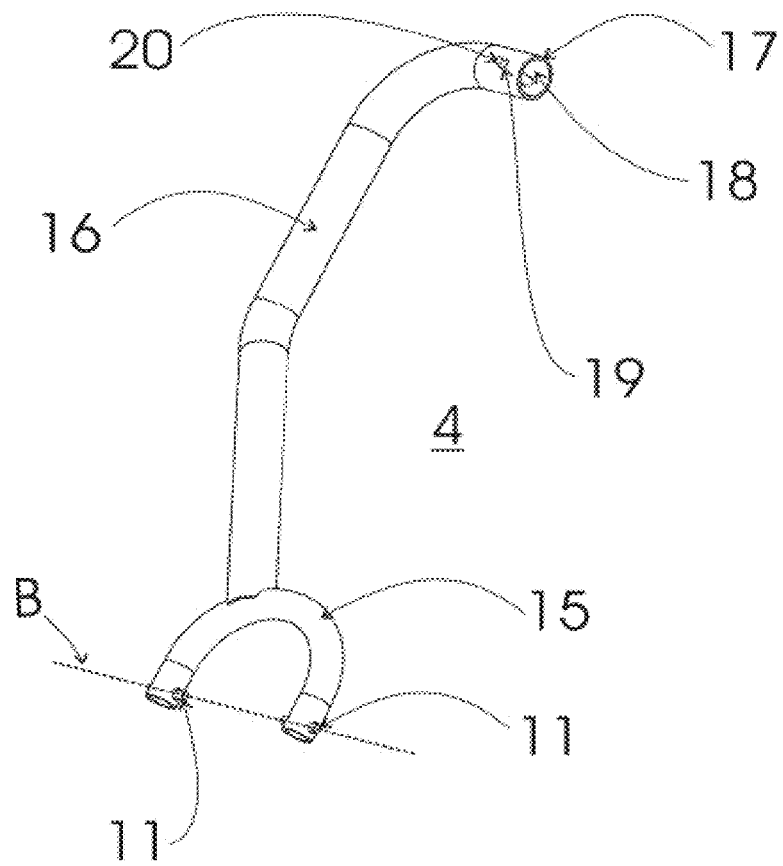
FIG. 4 represents a perspective detail view of an embodiment of another linking element.

A first linking element 4, represented along in FIG. 4, is pivotally connected to the subplate 2 at the level of the area z by a first bottom end 15, in particular thanks to two removable axes 11 such as screws or pins, and disposed coaxially with the axis B. The end 15 may form a housing allowing engaging the rear foot of a user therein according to a reverse «U» shape. The width of the end 155 is dimensioned so as to withstand lever constraints exerted on either side of the longitudinal axis A on the linking element 4. The second top end 17 of the linking element 4 has in particular a tubular and hollow shape, forming a cylindrical housing 18, and equipped with a radial axis hole 19 collaborating with a removable axis such as a pin 20. The main body 16 of the linking element 4 with a predetermined shape and length, securely connects the two ends 15 and 17 to each other. Its shape is asymmetrical according to the preferred embodiment and the plane P, in order to allow circumventing the top of the legs as well as the pelvis of a user normally standing right on the board 1. In addition, in case of a pronounced bending of the legs, when receiving a jump in particular, it is important to avoid every contact with the structure of the appliance. Hence, the linking element 4 is not rectilinear in the preferred embodiment. According to one embodiment, by considering a reference plane containing the axis A and the point o', more than 75% of the volume of the linking element 4 is located at one side of the reference plane. This arrangement is easily reversible by means of the removable axes 11, such that the user could choose which side he should set the linking element 4. Thus, the body 16 of the linking element 4 is positioned on one side of the legs of the user. In general, the elements for fastening the linking element 4 to the board 1 are adapted to allow mounting the linking element 4 orientated at one side of the reference plane or at the other side of the reference plane.

This linking element 4 can pivot freely (as represented for example in FIG. 7A) about the axis B when it is not constrained by other elements. It always remains constrained parallel to the plane P. The distance that may separate the end 17 from the plane P is predetermined and constant. The overall dimensioning as well as the construction materials of the linking element 4 are such so as to preserve this predetermined distance and to resist to the best any lateral bending constraint. In particular, it is made from an aluminum profile or else from composites materials in order to combine strength and lightweight. The width of the end 15 is dimensioned so as to withstand the lever constraints exerted on either side of the longitudinal axis A on the linking element 4.

A second linking element 3, represented along in FIG. 3, is pivotally connected, by means of removable axes 11' such as screws or pins disposed coaxially according to the axis C, to the subplate 2' at the level of the area z', by a first bottom end 12, forming in particular a housing allowing engaging therein the other foot of the user. A second top end with a cylindrical shape constitutes a male shaft 14, and serves as an axis of rotation according to a warping axis E. This shaft 14 is equipped on either side with two retaining bushing 13. These bushings are fastened by appropriate means which are not represented. The linking element 3 can pivot about the axis C when it is not constrained by other elements (as represented for example in FIG. 7A). It always remains constrained parallel to the plane P'. The center of gravity of the shaft 14 is materialized in a point o. Thus, the distance that may separate the point o from the plane P', zero according to this embodiment, still remains predetermined and constant. The warping axis E is substantially coaxial with the shaft 14 and parallel to the plane P'. A point x represents the intersection point between the axis C and the axis E. The overall dimensioning as well as the construction materials of the linking element 3 are such so as to preserve this predetermined distance and to resist to the best every lateral bending constraint. The linking element 3 is constrained parallel to the plane P'. In particular, it is made from an aluminum profile or else from composites materials in order to combine strength and lightweight. The width of the end 12 is dimensioned so as to withstand the lever constraints exerted on either side of the longitudinal axis A on the linking element 3.

According to a variant which is not represented, feet retention means, independent of the device according to the invention, are disposed proximate to the two subplates 2, 2' substantially on the longitudinal axis A. Consequently, the respective bottom portions 15 and 12 of the linking elements 4 and 3 are dissociated from any feet engagement constraint and may then be in different shapes related to purely mechanical or aesthetical constraints, in particular a left or right «L» shape, or else a reverse «T» shape, these shapes then replacing the described reverse «U» shape according to the preferred embodiment.

Figure 5:
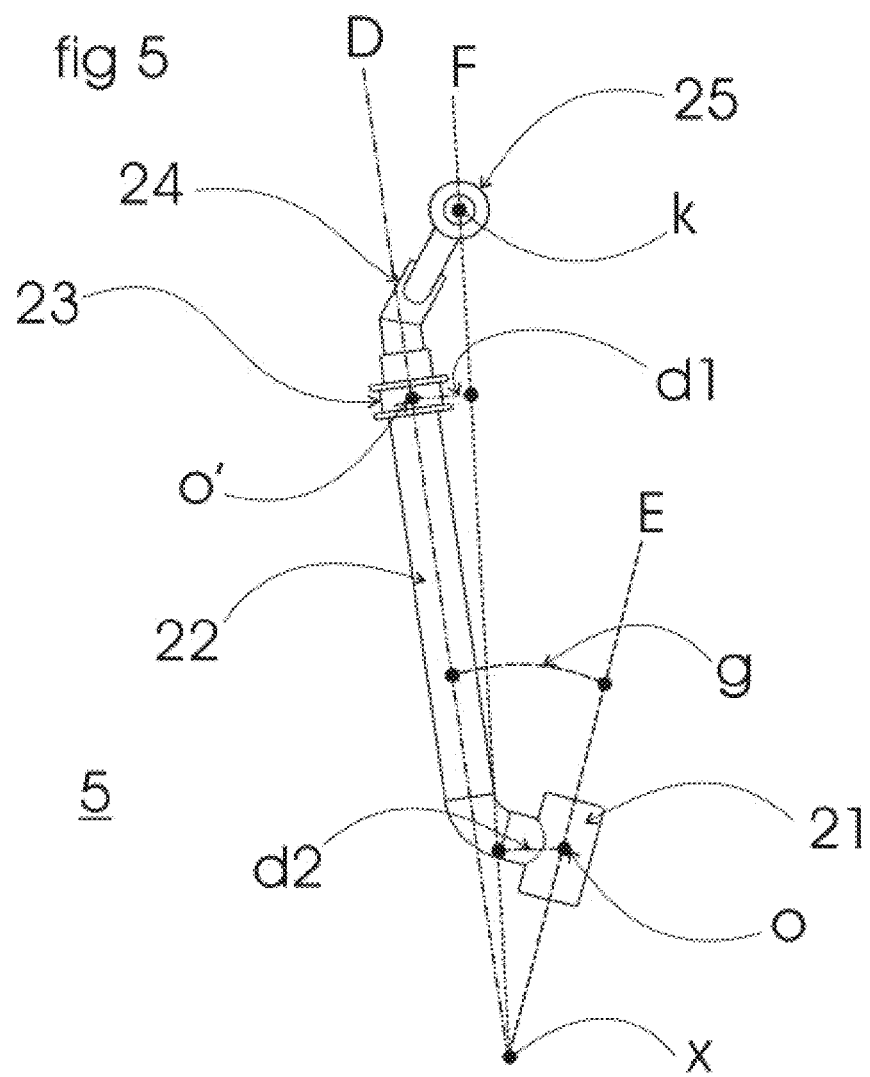
FIG. 5 represents a profile overview of an embodiment of a warping system and of the geometric elements governing the kinematics of the invention.

A warping element 5, described in connection with FIGS. 1, 5 and 7, has at a female bottom end 21 with a hollow cylindrical shape and serving as a bore. The center of gravity of the end 21 is located at the point o. It is recalled that the warping axis E passes through the point o. It meets the axis C at a point x. This axis E is coaxial with the cylindrical shape of the end 21 which properly collaborates, by its diameter and by its length, with the male shaft 14 of the linking element 3. The end 21 is retained trapped without an excessive clearance between the two bushings 13 of the linking elements 3. Anti-friction journals that are not represented may be disposed between the end 21 and the shaft 14.

The ends 21 and 14, collaborating coaxially with each other over a sufficient length to prevent any degree of freedom other than the rotation between the linking element 3 and the warping element 5 and to withstand the axial dissociation constraints. This length is ideally comprised between 20 mm and 120 mm but is larger than 10 mm, depending on the selected materials. Similarly, the distance separating the points o and x is also sufficient to withstand the axial dissociation constraints and is ideally comprised between 20 mm and 120 mm but is larger than 10 mm, depending on the selected materials.

The main body 22 with adapted shape and length is equipped with the shouldered journals 23 disposed opposite to one another and thus forming an anti-friction cylindrical cage. This pair of cylindrical shouldered journals 23 determines a point o' at the center of gravity thereof. An axis of rotation D passes through the points o' and x. The axes E and D describe therebetween a predetermined angle g. This pair of shouldered journals 23 is fastened on the main body 22 by means which are not represented such as screws or rivers, enabling when needed the adjustment of the height position thereof.

The warping element 5 is also equipped at its other end, according to the described embodiment, with a ride element 24 such as a handlebar, provided with two gripping members 25 such as a handles. The center of gravity of the gripping members 25 defines a point k. A bias axis F passes through the points k and x. The angle between the bias axis F and the axis D is comprised between 0° and 25°, preferably between 2° and 17°, more preferably between 5° and 15°, even more preferably between 6° and 8°, in particular about 7°.

According to a conventional device which is not represented, the ride member 25 may be adjustable in height with respect to the main body 22 of the warping element 5 throughout which it can slide.

According to a variant which is not represented, the respective shaft/bore functions of the elements 21 and 14 are reversed, the male portion then being located on the warping element 5 and the female portion being located on the linking element 3. The mechanical constraints governing this variant are the same as those described according to the preferred embodiment.

Figure 6:
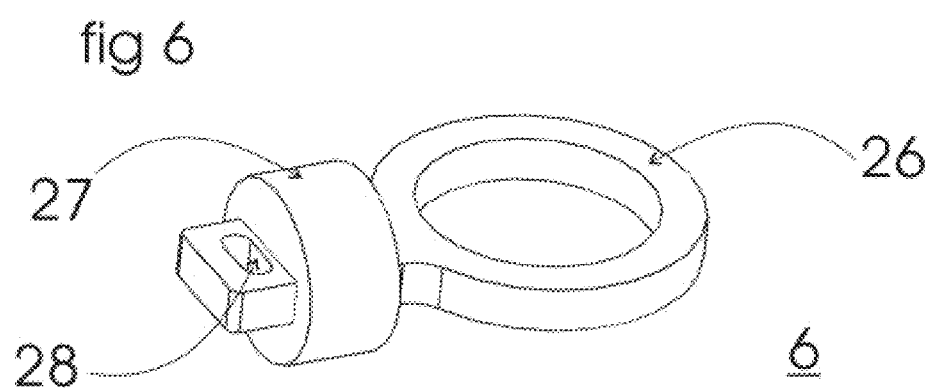
FIG. 6 represents a perspective detail view of an embodiment of a removable connector.

A removable retaining element 6 represented in FIG. 6 is secured to the pair of shouldered journals 23 via a ring 26 trapped therein. The internal diameter of the ring 26 is substantially larger than the external diameter of the journal of the shouldered journals 23. This pair of shouldered journals 23 is disposed coaxially to the ring 26 which can therefore rotate freely but cannot perform any translational movement along the main body 22. The removable retaining element 6 also has a mandrel 27 located in a radial extension of the ring 26. The mandrel 27 is properly dimensioned so that it could collaborate with the cylindrical housing 18 of the linking element 4. A pin housing 28 extends the mandrel 27 and collaborates with the pin 20 of the linking element 4. Hence, the retaining element can be pivotally connected to the top end 17 of the linking element 4.

When the removable retaining element 6 is in place at the top end 17 of the linking element 4, the point o' is made indissociable and at a fixed and predetermined distance from the linking element 4. Thus, when the device is at rest and the warping element 5 is not mobilized, the point o is at a zero or predetermined distance from the plane P and the point o' is a zero or predetermined distance from the plane P'.

The object of the invention is to impose a shift of the point o relative to the plane P and/or a shift of the point o' relative to the plane P' by means of a mobilization of the warping element 5, in particular through a rotational movement about the axis D thanks to the ride member 24; the distance separating the points o and o' being fixed and predetermined.

According to a variant which is not represented, the locking function described hereinafter is ensured without any removably affixed pin but with one single molded part, pivoting about the end 17 and having the necessary lugs for hooking to a fixed axis disposed throughout the holes 19 of said end.

Figure 7A:
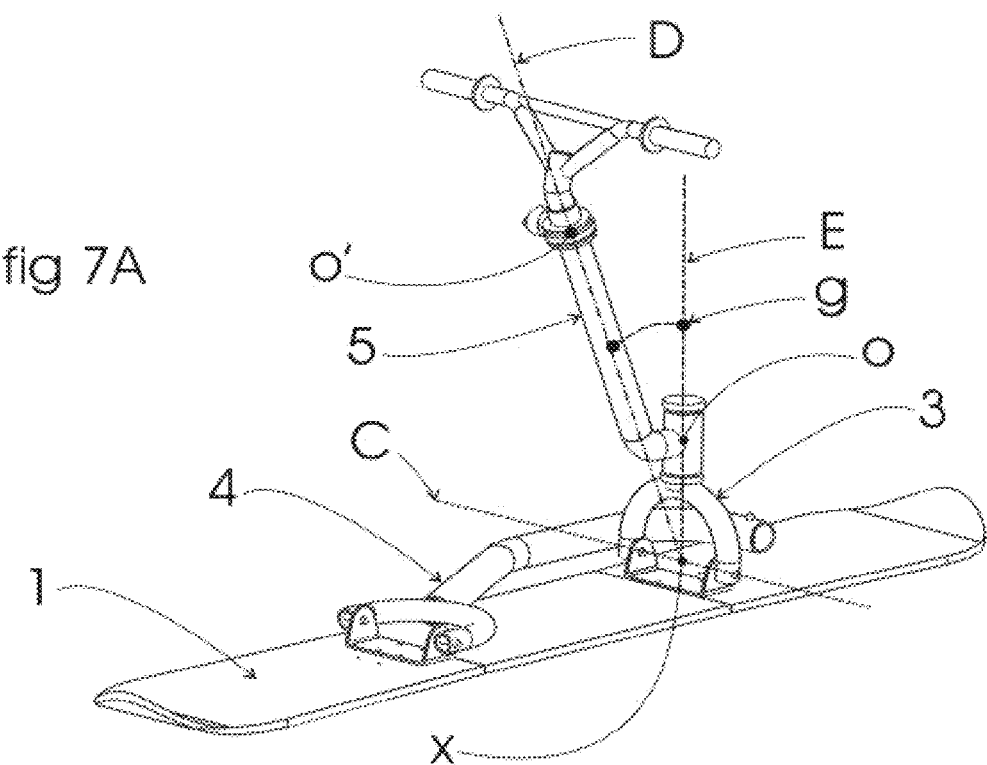
FIGS. 7A and 7B represent a perspective view of the principle according to the invention and according to two different positions.
Figure 10A:
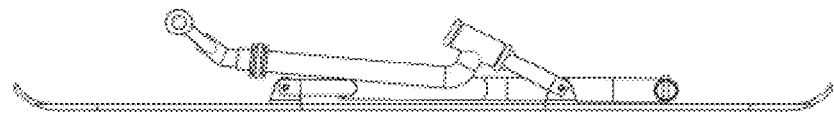
FIGS. 10A and 10B respectively represent a profile view and a perspective view of a surfboard equipped with the device according to the invention, in the folded position.
Figure 10B:
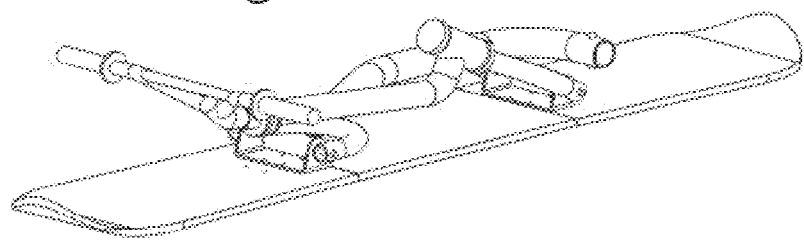

When the removable pin 20 is not disposed throughout the pin housing 28, then the linking element 3, the warping element 5 as well as the removable retaining element 6, connected to each other, are no longer connected to the linking element 4 as shown in FIG. 7A. The device according to the invention may then be folded as represented in FIGS. 10A and 10B, which is practical for mechanical lifts, transportation or else storage.

When the removable pin 20 is disposed throughout both the pin housing 28 and the axis hole 19, then the elements 3, 4, 5 and 6 are secured to each other (as represented in FIG. 1à and theoretically forms an hyperstatic set, enabling at least riding of the board 1 by swinging the ride member 24 on either side of the axis A. Nonetheless, surfboards have some construction flexibility. Thus, the rotation of the ride member 24 by the user, about the axis of rotation D, is therefore possible and causes a deformation of the board 1 by warping according to the longitudinal axis A as illustrated by FIGS. 8A, 8B, 9A and 9B.

Figure 7B:
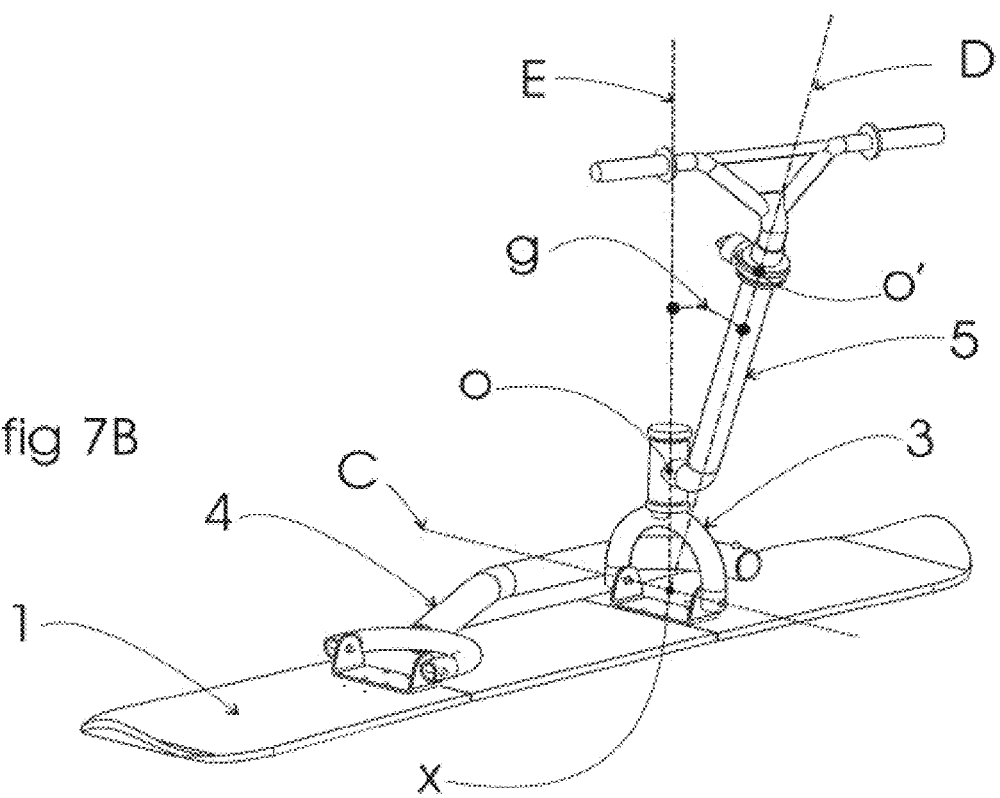

The warping element 5 is secured to the linking element 3, but has at least one degree of freedom in rotation about the axis E, and that independently of the linking element 4 which is not connected to the warping element 5 in FIGS. 7A and 7B. This displacement is possible in both directions, whether clockwise or counterclockwise, over a minimum angular sector of at least 2°, preferably of at least a few degrees, in particular 5°, more preferably of at least 10°. In the preferred embodiment illustrated in the two FIGS. 7A and 7B, it is easily understood that this sector is 360°. According to other embodiments, a small angular freedom of the ride member 24 may be compensated by a larger value of the angle g for the same warping effect on the board 1, but at the expense of a more considerable force on said ride member.

For the same rotation angular sector of the ride member 24, about the axis of rotation D, the deformation by warping effect on the board 1 will be proportional to the value of the predetermined angle g separating the two axes D and E. The value of g characterizing the angle between the axes E and D is at least 2°, preferably at least a few degrees, in particular 5°, more preferably at least 10°, in order to guarantee a perceivable torsional effect, and is preferably comprised between 10° and 35°. If the value of the predetermined angle g is equal to 0°, then the point o would lie on the axis of rotation D and its radial displacement would be zero. In this case, the board 1 would not undergo any torsional deformation about the axis A.

The point o and the axis E are common (FIGS. 1, 3, 5) to the linking element 3 and the warping element 5 characterizing the axial securing thereof, as represented in particular in FIGS. 7A and 7B.

The rotation of the ride member 24 in a counterclockwise direction creates an angle h between the planes P and P', characterizing the warping inducing a leftward turn of the board 1, as represented in FIGS. 8A and 8B.

The rotation of the ride member 24 in a clockwise direction creates an angle h' between the planes P and P', characterizing the warping inducing a rightward turn of the board 1, as represented in FIGS. 9A and 9B.

This deformation imposes the shift of the point o relative to the plane P and of the point o' relative to the plane P'. The angle h characterizes the magnitude of the warping effect on the board 1, independently of the distance separating the points o and x, because this is the value of the angle g that determines this magnitude.

When the ride member 24 is pivoted by its full effect magnitude, that is to say +/−90° relative to its rest position, then the angles h and h' are equal to the predetermined angle g.

When the user rides his surfboard, he engages a first foot into the end 21 of the linking element 3 and the second foot into the end 22 of the linking element 4. He can then incline the board 1 laterally according to the longitudinal axis A by means of the ride member 24, by lever effect. He can simultaneously turn said rid member according to the axis of rotation D selectively in a clockwise direction or else in a counterclockwise direction. Hence, in addition to the lateral lever effect, this action allows imposing in proportioned and simultaneous manner a torsion constraint on the board 1 according to the longitudinal axis A and characterized by the angle h between the planes P and P'. The warping element 5 then pivots about the axis D.

When the rider inclines the board 1 laterally about the axis A by means of the ride member 2), he lifts it from the snow towards its side internal to the turn and thus resists by a lever effect a force applied downward by his own weight, proportionally to the width of the board 1 and to the centrifugal force due to the execution speed. This force exerted by each of his feet, is successively transmitted up to the ride member 24, on the one hand, by the first subplate 2, the linking element 4, the removable retaining element 6 and the warping element 5; on the other hand, by the second subplate 2', the linking element 3 and then again the warping element 5. The user resists this force by means of the gripping members 25 such as a pair of handles whose center of gravity is materialized by the point k in FIG. 1. This resistance is exerted by a lever effect along the bias axis F passing through the points k and x as represented in FIGS. 1 and 5. This lever effect is proportional to the distance that separates the points k and x.

An excessive distance d2 between the point o of the bias axis F may cause a parasitic torque effect on the ride member 24, due to the weight applied by the rider on his corresponding leg. Similarly, an excessive distance d1 between the point o' of the bias axis F may cause a parasitic torque effect in a direction opposite to the first one on the ride member 24, due to the weight applied by the rider on his other leg.

Hence, the respective contact points o and o' of the linking elements 3 and 4 with the warping element 5, are preferably disposed on either side of the bias axis F when the distance d1 is no longer zero in order not to combine the bias torques but on the contrary make them antagonist. According to this arrangement, the distances d1 and d2 constitute a variable for defining the direction and the value of the final torque effect induced on the riding of the board 1. According to another configuration, the point o' may be disposed on the axis F itself, making it collinear with the axis D and making the distance d1 zero. It should be noted that the distance d2 is still independent from the angle g. This configuration will naturally cause a turn in the direction of the slope, which may be a pursued effect.

Figure 11:
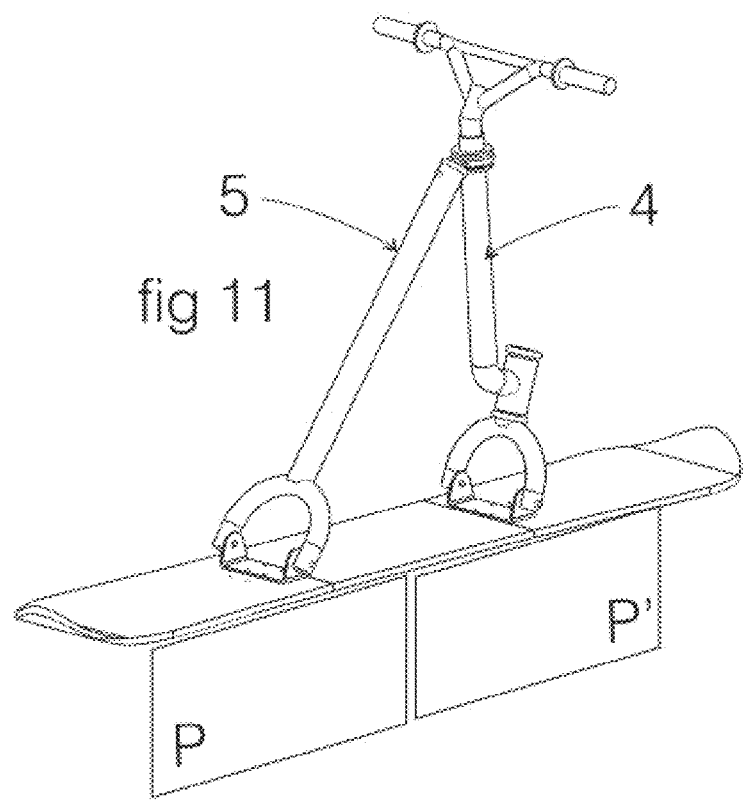
FIG. 11 represents a perspective view of a variant of the device according to the invention.

According to a variant described in connection with FIG. 11, the linking element 4 is substantially rectilinear and parallel to the plane P. The legs of the user are then disposed on either side of the linking element 4. According to another variant which is not represented, the linking element 4 is provided with a seat so as to allow riding the device in a seated position. According to another variant which is not represented, the retaining element 6 remains secured to the linking element 4 and is dissociable by the user from the warping element 5. According to another variant which is not represented, the linking element 4 is telescopic in order to make its length vary while keeping the point o' at a constant distance from the plane P, regardless of the displacement of the linking element 4 about the axis B. This arrangement can also allow folding the device without the dissociation of the removable retaining element 6 from any element to which it is connected. According to another variant which is not represented, the linking element 4 is constituted by two half-portions connected to each other by means of a rigid axis parallel to the axis B in order to make the overall length of said linking element 4 vary as a compass while keeping the point o' at a constant and predetermined distance from the plane P, regardless of the displacement of the linking element 4 about the axis B. Through a proper adjustment of the relative lengths of the two half-portions of said element 4, this arrangement can allow folding the device without the dissociation of the removable connector 6 from any element to which it is secured.

The invention claimed is:

1. A ride device for a snowboard, the snowboard comprising:
   a first feet stand area, located substantially on a first half of the snowboard, a perpendicular of the snowboard at a level of the first feet stand area with a first axis, crossing longitudinally the snowboard at its center of gravity, forming a first plane with the first axis; and
   a second feet stand area, located substantially on a second half of the snowboard, the perpendicular of the snowboard with the first axis at a level of the second area forming a second plane with the first axis,
   the ride device comprising:
   a first linking element intended to be connected to the snowboard at a first end via a first subplate at the level of the first feet stand area and constrained at least parallel to the first plane at a first point at a second end when the first linking element is connected to the snowboard;

a second linking element intended to be connected to the snowboard at a third end via a second subplate at the level of the second feet stand area and constrained at least parallel to the second plane at a second point at a fourth end when the second linking element is connected to the snowboard;

a warping element connected to the first linking element at least at a level of the first point, to the second linking element at least at a level of the second point, and keeping a fixed and predetermined distance between the first and second points, a free mobilization of the warping element imposing a shift of the second point relative to the first plane and of the first point relative to the second plane, wherein the warping element is pivotally connected to the second linking element about a second axis containing the second point, and can pivot freely about the second axis over an angular sector of at least 2° and wherein the warping element is pivotally connected to the first linking element about a third axis of rotation containing the first point, the second axis and the third axis of rotation having therebetween an angle of at least 2°.

2. The ride device according to claim 1, wherein the second linking element is pivotally secured to a first subplate about a fourth axis and wherein the warping element comprises gripping members, the first point being located between the gripping members and the second point, the gripping members defining a fifth axis passing through a center of gravity of the gripping members and an intersection point between the second axis and the fourth axis.

3. The ride device according to claim 2, wherein the first and second points are disposed on either side of the fifth axis.

4. The ride device according to claim 2, wherein the first point is coincident on the fifth axis.

5. The ride device according to claim 4, wherein the first linking element is not rectilinear.

6. The ride device according to claim 4, wherein the first linking element is pivotally connected to the snowboard about a sixth axis.

7. The ride device according to claim 6, wherein the first linking element is telescopic in order to make its length vary while keeping the first point at a constant distance from the first plane, regardless of the displacement of the first linking element about the sixth axis.

8. The ride device according to claim 6, wherein the first linking element comprises two half-portions connected to each other according to a seventh axis of rotation parallel to the sixth axis in order to make an overall length between ends of the first linking element vary while keeping the first point at a constant distance from the first plane, regardless of the displacement of the first linking element about the sixth axis.

9. The ride device according to claim 1, comprising a retaining element which connects the first linking element with the warping element, and the retaining element is made removable at least from the second linking element or the warping element.

10. The ride device according to claim 9, wherein the first linking element is not rectilinear.

11. The ride device according to claim 10, wherein the first linking element is pivotally connected to the snowboard about a sixth axis.

12. The ride device according to claim 11, wherein the first linking element is telescopic in order to make its length vary while keeping the first point at a constant distance from the first plane, regardless of the displacement of the first linking element about the sixth axis.

13. The ride device according to claim 11, wherein the first linking element comprises two half-portions connected to each other according to a seventh axis of rotation parallel to the sixth axis in order to make an overall length between ends of the first linking element vary while keeping the first point at a constant distance from the first plane, regardless of the displacement of the first linking element about the sixth axis.

14. The ride device according to claim 1, wherein the first linking element is not rectilinear.

15. The ride device according to claim 1, wherein the first linking element is pivotally connected to the snowboard about a sixth axis.

16. The ride device according to claim 15, wherein the first linking element is telescopic in order to make its length vary while keeping the first point at a constant distance from the first plane, regardless of the displacement of the first linking element about the sixth axis.

17. The ride device according to claim 15, wherein the first linking element comprises two half-portions connected to each other according to a seventh axis of rotation parallel to the sixth axis in order to make an overall length between ends of the first linking element vary while keeping the first point at a constant distance from the first plane, regardless of the displacement of the first linking element about the sixth axis.

* * * * *